(No Model.)

H. W. LIBBEY.
WHEEL.

No. 490,391.  Patented Jan. 24, 1893.

Witnesses.  Inventor.
Hosea W. Libbey
by Edwin Planta
attorney

THE NORRIS PETERS CO., PHOTO-LITHO., WASHINGTON, D. C.

UNITED STATES PATENT OFFICE.

HOSEA W. LIBBEY, OF BOSTON, MASSACHUSETTS.

WHEEL.

SPECIFICATION forming part of Letters Patent No. 490,391, dated January 24, 1893.

Application filed May 16, 1892. Serial No. 433,103. (No model.)

*To all whom it may concern:*

Be it known that I, HOSEA W. LIBBEY, a citizen of the United States, residing at Boston, in the county of Suffolk and State of Massachusetts, have invented certain new and useful Improvements in Wheels, of which the following, taken in connection with the accompanying drawings, is a specification.

The object of my invention is to produce a duplex tread wheel particularly applicable to velocipedes and the like, and the invention consists in a wheel having two treads whereby it will be self-supporting in a perpendicular position.

Figure 1:
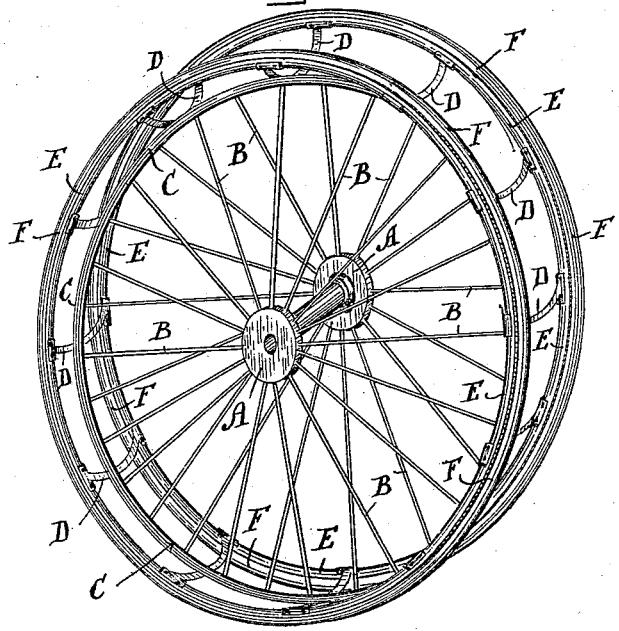
Figure 2:
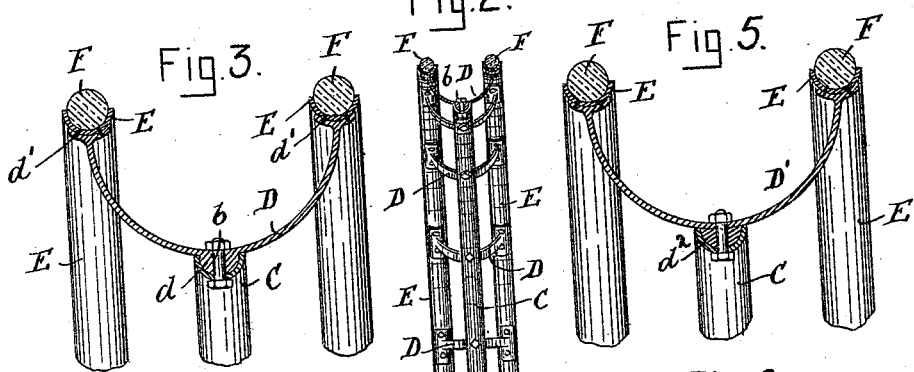

Referring to the accompanying drawings: Figure 1—represents a perspective view of a tension wheel having two treads according to my invention. Fig. 2—represents a vertical section through the same, the hub and spokes being removed. Figs. 3 to 6—are detail views showing how the two treads are attached to the rim of the wheel.

A, represents the hub, B, the spokes, and C, the rim of an ordinary velocipede tension wheel.

D, are arms secured to the rim C, and E, E, are rims attached to the ends of the arms.

F, F, are rubber tires sprung into the rims E.

Figure 3:
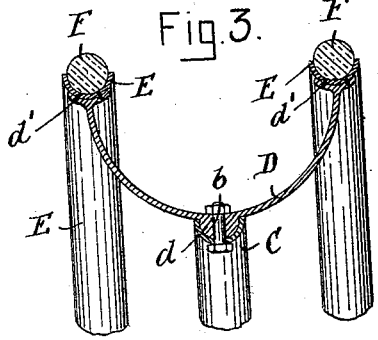
Figure 4:
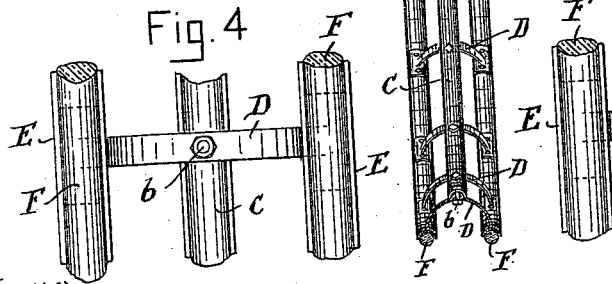

To convert an ordinary velocipede wheel into a wheel embodying my invention, the rubber tire is removed, and to a portion of the rim are secured some of the arms D, these arms as shown in Figs. 3 and 4 are at their centers formed with half round projections $d$, that fit into the recess of the rim C, and are secured thereto by a bolt $b$, and the outer ends of the arms are formed with half round recessed pieces $d'$, into which are fitted rims E, E, that are secured thereto by screws or rivets. After the rims E, have thus been secured to these arms, the remaining arms are slipped in between the rim C, and the rims E, and secured in the manner before described. After all the arms D are thus secured, rubber tires F, are sprung into the grooves in the rims E, and the wheel is complete. It will be seen that by this construction a duplex tread wheel is produced that will stand perpendicularly of its own accord, which will be a great advantage for bicycles, as the rider can stop his machine and stand still without any danger of the machine toppling over.

Figure 5:
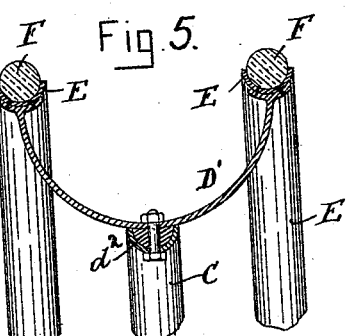

In Fig. 5 I have shown the hollow space of the rim C, filled with a block $d^2$, and an arm D' secured thereto, so that the arms are formed without the rounding projection $d$.

Figure 6:
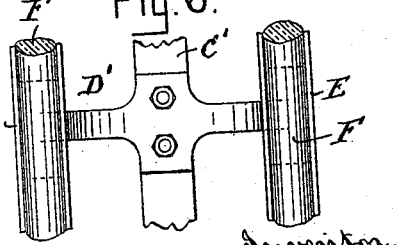

In Fig. 6 I have shown an arm $D^2$ secured to a wheel with a flat rim C'.

Although I have shown and described my invention applied to a tension wheel, it is obvious that it could be applied to any description of wheel, and the rims E, might be flat on their surface, and the rubber tires dispensed with if desired.

What I claim is:—

1. In combination with a wheel consisting of a hub and rim connected together by spokes, a series of arms secured to the periphery of said rim the ends of the arms on each side having a rim or tire secured thereto substantially as set forth.

2. A wheel consisting of a hub, spokes and a central rim, arms secured to the said central rim, and projecting on each side, and an outer rim secured to the ends of the arms on each side of the central rim substantially as set forth.

3. In combination with a tension wheel consisting of a hub A, spokes B, and rim C, a series of arms D, each having at its center a rounded projection $d$, to fit into the rim C, and secured thereto by a bolt $b$, the outer ends of each arm having a rounded recessed piece $d'$, the rims E, secured thereto and rubber tires F, substantially as set forth.

In testimony whereof I have signed my name to this specification, in the presence of two subscribing witnesses, on this 30th day of March, A. D. 1892.

HOSEA W. LIBBEY.

Witnesses:
CHAS. STEERE,
EDWIN PLANTA.